United States Patent
Bird et al.

(10) Patent No.: US 6,261,087 B1
(45) Date of Patent: Jul. 17, 2001

(54) PILOT FLAME POWERED BURNER CONTROLLER WITH REMOTE CONTROL OPERATION

(75) Inventors: Douglas D. Bird, Little Canada; John E. Bohan, Jr., Edina; Patrick S. Gonia, Maplewood, all of MN (US)

(73) Assignee: Honeywell International Inc., Morristown, NY (US)

( * ) Notice: Subject to any disclaimer, the term of this patent is extended or adjusted under 35 U.S.C. 154(b) by 0 days.

(21) Appl. No.: 09/453,845

(22) Filed: Dec. 2, 1999

(51) Int. Cl.[7] ................. F23N 5/10; F23N 5/24
(52) U.S. Cl. ................. 431/80; 431/18; 431/75; 126/512
(58) Field of Search .............. 431/18, 80; 126/512

(56) References Cited

U.S. PATENT DOCUMENTS

| 4,433,719 | 2/1984 | Cherry et al. |
| 4,696,639 | 9/1987 | Bohan, Jr. |
| 4,734,658 | 3/1988 | Bohan, Jr. |
| 4,770,629 | 9/1988 | Bohan, Jr. |
| 4,773,847 | * 9/1988 | Shukla et al. ............ 431/46 |
| 4,984,981 | 1/1991 | Pottebaum |
| 5,051,089 | 9/1991 | Jayaram |
| 5,081,981 | 1/1992 | Beal |
| 5,092,519 | 3/1992 | Staats |
| 5,450,841 | * 9/1995 | Whitaker et al. ........ 126/512 |
| 5,518,396 | * 5/1996 | Muzzolini et al. ....... 431/80 |
| 5,539,672 | * 7/1996 | Mullin et al. ............ 431/80 |
| 5,654,813 | * 8/1997 | Whitworth .............. 126/512 |
| 5,722,823 | * 3/1998 | Hodgkiss ................ 431/43 |

FOREIGN PATENT DOCUMENTS

008533 * 5/1983 (JP) ..................... 431/18

* cited by examiner

Primary Examiner—Carl D. Price (57) ABSTRACT

A burner system for use in applications such as a gas fireplace insert has a main burner, a standing pilot burner, a burner control unit, and a fuel valve. In one embodiment, the fuel valve and burner control unit receive power from a power source such as a thermopile mounted to receive energy from the pilot burner. The burner control unit includes a switch controlling power to the fuel valve and a RF receiver. The RF receiver controls the opening and closing of the switch responsive to encoded RF signals transmitted to it by a remote transmitter.

22 Claims, 2 Drawing Sheets

FIG. 1

PILOT FLAME POWERED BURNER CONTROLLER WITH REMOTE CONTROL OPERATION

BACKGROUND OF THE INVENTION

Gas and oil burners of all types use a controller to safely initiate, monitor, control, and shut down combustion. Simple systems such as those for gas water heaters use mechanical controllers and thermostats for this function. This is possible because the water tank receiving heat is close to the burner providing that heat. Where the heat from the burner is delivered for use at a point remote from the burner as is typical for a home furnace, the thermostat for sensing demand for heat must be located remote from the burner in a room where the heat is delivered. It is not convenient to use a mechanical controller and thermostat in such situations, so it is customary to use an electrically operated controller and thermostatic switch wired to the controller.

Again conventionally, it is customary to use a 24 v. transformer to power electrical burner controllers. But there are also systems which generate their own power using thermopiles, see U.S. Pat. Nos. 4,770,629 and 4,696,639, both by Bohan. There are substantial advantages for such self-powered systems. In the first place, the expense of wiring the controller with line power is avoided. Secondly, the burner continues to operate safely even during power outages. While typical central hot air and hydronic heating systems need line power to operate properly, auxiliary gas burning heaters which have no fan or pump can profitably employ a self-powered controller.

One example of an auxiliary gas burning heater is the gas fireplace. While wood-burning fireplaces are very common, they have a number of drawbacks such as inconvenient fueling, ashes removal and disposal, creosote buildup in the chimney, and environmental pollution. Accordingly, the gas fireplace, typically using natural gas as fuel, has been developed as an alternative to wood-burning fireplaces. In a gas fireplace, natural gas is piped to a burner element typically hidden behind a simulated log. Burning this gas from the burner creates a flame which is both realistic and very safe. Gas fireplaces are also relatively inexpensive to install or retrofit into a wood-burning fireplace, they burn cleanly and efficiently, and they require little or no maintenance. These gas fireplaces can be designed to produce heat efficiently for the room in which they are installed, so they can serve as relatively high capacity auxiliary heat sources, something that has always been difficult for wood-burning fireplaces to achieve.

Early gas fireplace units required manual lighting each time the user wanted operation, but more recent units have a standing pilot flame, so that the fireplace can be turned on by simply opening a valve for the main gas flow. This usually requires operating a valve within the fireplace which is inconvenient for a number of reasons.

Gas fireplaces are one type of auxiliary heat source which can profitably use a self-powered controller, as can wall-mounted supplementary heat sources also. In either case, the heat outputs are large enough to make thermostatically control burner operation desirable. More so in retrofit situations, it is difficult to install the conductor pair between the remotely located thermostat or activator and the burner control which is located within the fireplace or within the housing of a conventional auxiliary heater. 24 v. systems are now available which use a battery-powered portable control with an integral thermostat function which communicates with the controller by an RF signal, thereby avoiding the need for a wired thermostat or physical access to the controller itself.

Thus, state of the art self-powered burner controllers must be wired to a remote thermostatic switch or activator. Line powered controllers of course require wiring for low voltage power, but can operate with wireless remote activation.

BRIEF DESCRIPTION OF THE INVENTION

We have developed an improved self-powered burner control system which operates the burner in response to demand from a remote wireless thermostat or other activator. Such a system is intended for a burner unit having a main burner and a standing pilot burner. A controller for such a system includes a power source for operating the electronic components of the controller. The controller is particularly suitable for electrical generators and other power sources having low output. A preferred version of an electrical generator having a relatively low power output comprises a thermopile mounted to receive heat from the pilot burner flame, and in response to this heat, provide a power voltage. We intend the term "thermopile" in this context to refer to any device which can convert heat energy to electric power in sufficient quantity to operate an electronic burner control. Other electrical generators with low power output such as photovoltaic elements convert radiant energy from the pilot flame to electrical power. Even electrical power storage devices such as batteries might in appropriate circumstances serve as a power source for some controller designs. Where the electrical generator is unable to directly provide adequate voltage to operate available electronic circuitry, the generator can include a DC to DC converter to provide a second, higher voltage to the electronic circuitry.

An electrically controlled fuel valve receives fuel from a fuel source and controls fuel flow to the main burner. The valve has an open state responsive to presence of a valve operating voltage at a control terminal and a closed state responsive to absence of the valve operating voltage at the control terminal. Fuel is allowed to flow or prevented from flowing to the main burner from the fuel source accordingly as the valve is in its open or closed states.

A wireless signal receiver receives the second power voltage. The receiver converts a coded wireless burner control signal having a control code therein specifying an operating condition for the burner unit, to a burner control signal encoding the control code. A transmitter which can in one embodiment be operated manually by a user and in another comprises a thermostat, includes a switch which when closed causes the wireless burner control signal to radiate. The receiver when close enough to the transmitter receives this signal.

A logic unit, typically a microprocessor, receives the burner control signal from the receiver, and also receives the second power voltage. Responsive to a preselected value of the control code in the burner control signal, provides a first switch closure signal. A valve switch is connected to provide power from the thermopile to the valve. When the logic unit provides the first switch closure signal to the valve switch, the switch connects the thermopile to the valve. The thermopile then provides at least a portion of the valve operating voltage to the valve when the valve switch is closed.

The generators currently available have power output barely able to operate the controllers which we can presently devise in addition to holding the valve open. To address this problem we provide a receiver switch having a first power terminal connected to receive power from the generator, a second power terminal connected to the receiver's first power terminus, and a control terminal. A second switch closure signal at the receiver switch control terminal electrically connects the receiver switch's first and second power terminals, thereby providing generator power to the receiver. The logic unit is designed to periodically provide the second switch closure signal to the receiver switch control terminal. By providing the second switch closure signal for a small percentage of the time, receiver power consumption can be substantially reduced.

DESCRIPTION OF THE PREFERRED EMBODIMENTS

Figure 1:
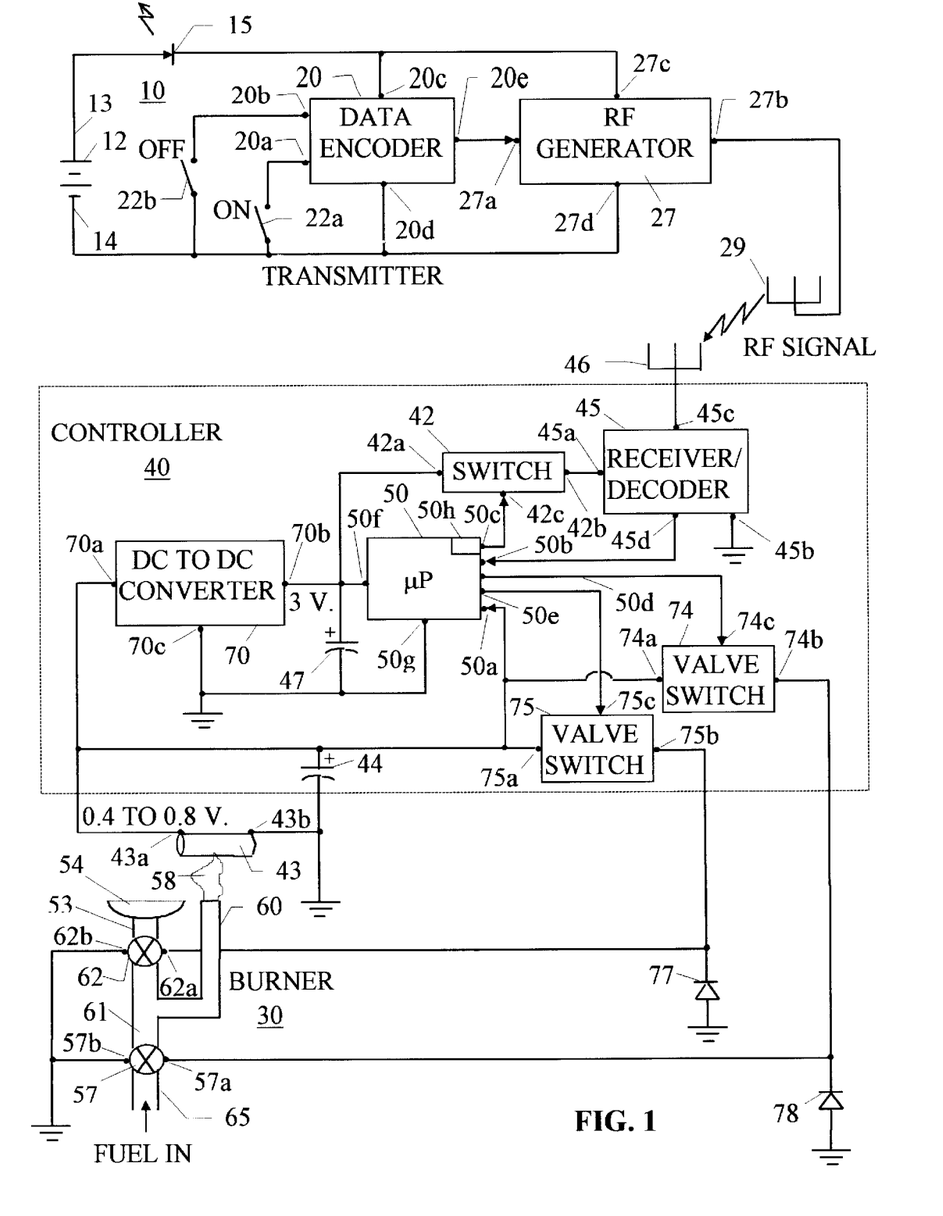
FIG. 1 is a block diagram of a system incorporating the invention.

The block diagram of FIG. 1 discloses a burner control system having the two major elements mentioned above of a transmitter unit 10 and a controller 40. The transmitter unit 10 has technical features similar to commonplace devices for remote control of various types of equipment, garage door openers and toys such as model airplanes being only two examples. The commercial version of this system is designed to operate at a standard 300 Mhz RF carrier frequency. It is possible that the radiated signal energy need not be RF waves however. IR or visible light could be used in certain situations. Even ultrasonic sound is a possible communication path. For the present however, RF communication seems to be preferable.

BURNER OPERATION

The burner at 30 to be controlled is shown in FIG. 1, and has a supply pipe 65 through which fuel for burning is conveyed from a fuel source. A pilot or safety valve 57 can be manually held open and manually closed, and will also be held open electrically during normal operation. In the preferred embodiment shown in FIG. 1, valve 57 is a special design which is held open by as little as 10 ma. of current passing between its power terminals 57a and 57b. One suitable type is valve model VS8510 available from Honeywell Inc., Golden Valley, Minn., which includes valve 62 as well in the same valve body.

Fuel flows to main burner 54 through a pipe 53 and electrically operated main burner valve 62 which receives its fuel flow from pipe 61. It is presumed certain that presence of a pilot flame 58 will ignite the fuel flowing from main burner 54. Control of the valve 62 state is the purpose of the remaining elements of controller 40. Valve 62 is a special low current design which can be opened and held open by a power source providing at least 20 ma. While opening, valve 62 requires as much as 50 ma. at 0.3 v. Valve 62 closes automatically when power is removed, extinguishing the main burner 54 flame.

A pilot burner 60 provides the pilot flame 58 which heats an end of a thermopile 43. Pilot flame 58 is a standing pilot, meaning that it burns continuously during standby operation, must be manually lit (typically at the start of the heating season), and is normally extinguished by manually closing safety valve 57. While flame 58 is present, thermopile 43 provides current for operating controller 40 and for providing power for valves 57 and 62. Once flame 58 is present, during normal operation flame 58 sustains itself as long as valve 57 is open and fuel is available at pipe 65. If the pilot flame 58 is lost due to some malfunction, thermopile 43 soon thereafter cools to an extent causing voltage output to drop. This condition is detectable relatively quickly, and is used to determine that valves 57 and 62 should be closed.

A suitable commercial version of thermopile 43 is available from Honeywell Inc., Golden Valley, Minn. as part no. Q313. In normal operation, such a unit provides around 80 ma. at about 0.3 to 0.8 v. While this voltage is not adequate to operate standard electronic circuitry, there is adequate power for such use. This low voltage can be converted by suitable circuitry to 3 v. DC with sufficient current to operate a low power microprocessor and a low power RF or other wireless receiver.

TRANSMITTER STRUCTURE AND OPERATION

Figures 2, 3:
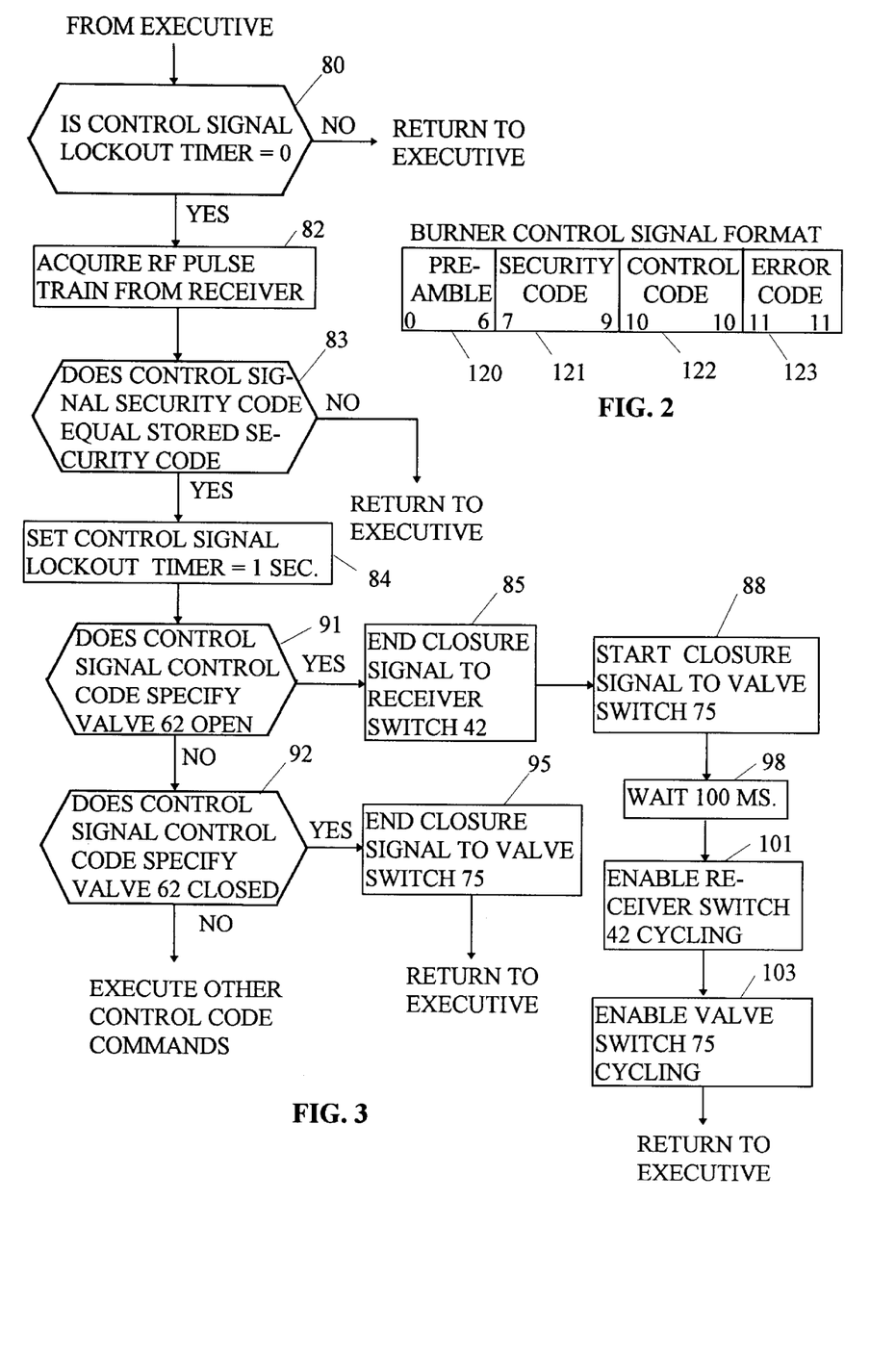
FIG. 2 shows the format of a burner control signal encoded in the wireless signal issued by a transmitter and in a burner control signal provided by a receiver to a processor.
FIG. 3 is a flow chart diagraming operation of software executed by the processor in controlling the system shown in FIG. 1.

Operation of burner 30 is controlled by a burner control signal which is transmitted by a transmitter unit 10 when switches in transmitter 10 are closed by a user. Transmitter unit 10 may be a hand-held or wall mounted device similar to a garage door opener transmitter. The format of the burner control signal is shown in FIG. 2 and will be discussed shortly. Such transmitter units form part of other systems such as garage door openers and as such, unit 10 includes much conventional technology. Unit 10 includes a 4.5 v. battery 12 providing operating power for the two major operating components of unit 10, a data encoder 20, and a RF generator 28. Power from a first terminal 13 of battery 12 is supplied to an LED 15 which functions as both a battery level and activation indicator. Current flowing through the LED 15 and a second battery terminal 14 is applied across power terminals 20c and 20d of data encoder unit 20. Power from battery 12 is also supplied across power terminals 27c and 27d of RF generator unit 27. While neither terminal 13 nor 14 of battery 12 will typically be grounded, it is convenient to consider terminal 14 as having a 0 v. potential, to which other voltages of transmitter 10 will be referenced hereafter.

The burner control signal (BCS) is a RF transmission modulated to encode a pulse train having a data format shown in FIG. 2. Transmission of digital data as RF modulated pulse trains is well known and no further note need be taken of it. Each BCS pulse train has a first preamble field 120 comprising 7 bytes (bytes 0–6) having a standardized pattern enabling field 120 to be identified as the preamble. (We follow the convention that a byte is 8 bits.)

The following 5 bytes comprise 3 additional fields. These 5 bytes are for transmission as an RF signal, encoded into 10 bytes whose form is more suitable for RF transmission. Thus, the transmitted BCS signal comprises 17 bytes total within the RF transmission, but in actuality comprising a total of 12 bytes of data. The first of these 3 fields is a security or identifier code field 121 following the preamble field and in bytes 8–10 of the BCS. The security code field 121 is unique to the particular transmitter and during normal operation always has the same value within a given burner system. A control code field 122 occupying byte 10 and following the security code field 122 has a variable value. The control code value comprises the control or command information within the BCS. The last byte, byte 11, of the BCS is an error detection code field 123. This may be nothing more than a check sum. Decoding the 10 bytes following the preamble and applying the error detection code is routine.

In a commercial embodiment incorporating this invention, data encoder 20 includes a pair of enable terminals 20a and 20b to which are respectively connected first terminals of momentary ON switches 22a and 22b. Second terminals of switches 22a and 22b are connected to battery terminal 14. Encoder 20 has power terminals 20c and 20d which are connected to battery 14. Data encoder 20 is a special purpose microcircuit which is designed to provide at its output terminal 20e the BCS in its 17 byte format and with timing suitable for directly modulating an RF signal. The value of the control code in the BCS is under the control of the user by manipulation of switches 22a and 22b. In one embodiment of this invention each of the switches 22a and 22b controls the value of a single bit of the control code 123, for a total of two active control bits in the control code field. In other embodiments, there may be more switches, or more commands controlled by switches 22a and 22b, by which additional values of the control code 122 can be supplied to control burner 30 operation. These additional values may provide for changing the rate at which fuel flows to main burner 54. In the commercial embodiment of FIG. 1, the entire BCS as encoded in the RF transmission is 35 ms. long.

When switch 22a or 22b is closed, data encoder 20 provides the BCS as a pulse train to its terminal 20e which is conducted by the signal path shown to terminal 27a of RF generator 27. Generator 27 receives power from battery 14 at terminals 27c and 27d. Generator 27 uses the encoded BCS from data encoder 20 provided at terminal 27a to modulate an RF carrier signal. The modulated RF carrier signal is provided on terminal 27b to antenna 29 which radiates it throughout the immediate area and to controller 40, as a coded wireless control signal having a control code therein specifying an operating condition for the burner unit. The 3 byte security code of field 121 identifies the transmitter 10 as the source of the RF signal. The control code byte value encoded in field 122 of the RF carrier signal specifies the operation for the controller 40. For example, in the system of FIG. 1 closing switch 22a causes an RF signal to be generated which specifies a demand for main burner 54 operation (ON), which occurs by opening valve 62. Operating switch 22b serves to generate an RF signal commanding controller 40 to shut valve 62 (OFF) and end burner 54 operation. A third command value could be sent in this configuration by closing both switches 22a and 22b, and of course the unused bits of the control code byte are available for other purposes.

Generator 27 is designed to send over a 1.1 sec. interval, consecutive identical BCS's encoding the commands which switches 22a and 22b provide. If for example an individual BCS is 35 ms. long as indicated above, then approximately 30 identical pulse trains will be sent each time a switch 22a or 22b is closed.

CONTROLLER OPERATION

Power to operate valves 62 and 57 and controller 40 is provided by thermopile 43 which is physically positioned so that one end of its package receives heat from pilot flame 58, as shown in FIG. 1. As previously mentioned, while pilot flame 58 is present, thermopile 43 provides a constant source of power for operating valves 62 and 65 and controller 40. The Honeywell Q313 version of thermopile 43 can continuously produce about 80 ma. at about 0.3 to 0.8 v. while flame 58 is present. It is not easy to provide a thermopile voltage large enough to directly operate electronic circuitry because such a high voltage requires a much larger package. To adequately heat such a large thermopile package requires a much larger than normal pilot flame 58 and substantially greater fuel usage during standby operating mode. And at least in the gas fireplace application, such an enlarged thermopile package could be visually obtrusive.

Because of the low output voltage from thermopile 43, it is necessary to convert this voltage to a higher value suitable for operating available circuitry. Converter 70 receives the thermopile voltage across its input power terminal 70a and its ground terminal 70c and in our preferred design provides 3 volts regulated DC at up to 10 ma. across second power terminal 70b and ground terminal 70c for operating receiver 45 and microprocessor 50. When processing these low voltages, it is necessary to use semiconductor devices which have relatively low voltage drops. For this reason, we prefer to use germanium diodes or Schottky diodes and MOSFET switching elements within converter 70. Current directly from thermopile 43 also opens valve 62 and holds valve 57 open. Pending patent applications having Ser. Nos. "09/459,078 and 09/497,611, a common assignee with this application, Brent Chian as applicant, and a filing date of Nov. 29, 1999, and respectively", entitled "Low Input Voltage, High Efficiency Dual Output DC-DC Converter" and "Low Input Voltage, Low Cost Micropower DC-DC Converter" teach one suitable design for converter 70. These two applications are incorporated by reference into this application.

A logic unit such as microprocessor 50 controls the entire operation of controller 40. While there are-many microprocessor types which are suitable, we prefer at the present time to use one identified as model AT 90LS8535 available from Atmel Corp., San Jose, Calif. The Atmel '8535 can operate on voltage as low as 2.7 v. and draws 3 ma. maximum and approximately 0.6 ma. in a sleep mode. Converter 70 provides power from its output power terminals 70b and 70c to microprocessor power terminals 50f and 50g. It is possible although usually not economic for a number of reasons, to perform the control activity of processor 50 with special purpose logic circuitry. We use the term "logic unit" to refer to both general purpose processors such as processor 50 and to special purpose logic circuitry.

As is well known, microprocessors provide a very flexible and cost-effective means for controlling many different types of systems. The software controlling microprocessor 50 operations here in effect transforms the microprocessor into the various circuit components necessary to perform the various control activities for the system. The functions of these components are described in the flow chart of FIG. 3 which describes the software which implements these functions. Thus, microprocessor 50 and its software together become a physical system whose component parts exist sequentially in time. These component parts communicate through the data stored in the microprocessor 50 memory. From this standpoint, each of the software-generated circuit elements which the microprocessor becomes while executing the software application of FIG. 3 have brief physical existence.

Valves 57 and 62 are operated by current provided by thermopile 43. Thermopile power to valves 57 and 62 is controlled by valve switches 74 and 75 respectively. Because of the low voltage and current available for operating valve 62 and holding open valves 57 and 62 it is important that valve switches 74 and 75 have low voltage drops and low internal impedance, and very small control current. One suitable generic device suitable for use as these switches 74 and 75 is an N channel power MOSFET.

When cold starting operation of burner 30 no pilot flame 58 exists. At this point, microprocessor 50 receives no power from converter 70 and is inactive. As earlier explained, pilot valve 57 is designed to be manually held open. From cold start, a user manually holds valve 57 open and lights pilot flame 58 with a match. As pilot flame 58 warms thermopile 43, voltage appears across its terminals 43a and 43b and is applied to input terminals 70a and 70c of converter 70. When microprocessor 50 receives enough power from converter 70 to begin operation, one part of an initially executed bootup routine causes microprocessor 50 to provide a switch closure signal at terminal 50d to the control terminal 74c of pilot valve switch 74. Valve switch 74 starts to conduct holding current to pilot valve 57, which at this point is being manually held open. With holding current flowing to pilot valve 57, the user can release pilot valve 57 which is then held open by the holding current.

Controller 40 includes a receiver/decoder 45 having an input terminal 45c to which is connected to an antenna 46 receiving signals from transmitter 10. (If transmitter 10 uses some other carrier such as infrared or ultraviolet light, antenna 46 must be replaced with an appropriate sensor.) Converter 70 provides operating power through a receiver switch 42 to receiver power terminals 45a and 45b. Switch 42 includes power terminals 42a and 42b and a control terminal 42c. A switch closure signal at terminal 42c electrically connects terminals 42a and 42b at power terminals 45a and 45b, allowing power from converter 70 to flow to receiver power terminal 45a. We prefer switch 42 to be a low impedance, low voltage drop P-channel MOSFET transistor. Each time one of the control switches 22a or 22b in transmitter 10 is operated, antenna 46 receives from transmitter 10 a RF signal encoding the digital message associated with that control switch, and provides this RF signal to receiver terminal 45c. When power is available at terminal 45a, receiver 45 detects the modulations in the RF signal from transmitter 10 and decodes the RF signal, recreating the original BCS provided by data encoder 20, using the error code in field 123 to assure that the BCS has been transmitted and received correctly. Receiver 45 then serially provides the decoded BCS at signal terminal 45d. Receiver 45 is of largely conventional design, but constructed of components and using a circuit design which minimizes its power consumption so that it will reliably operate on the relatively small current available from converter 70 and shared with microprocessor 50.

In order to save power, microprocessor 50 includes a receiver switch timer 50h which provides a receiver switch closure signal to switch terminal 42c only during a single 80 ms. sampling interval every 1.0 sec. Receiver 42 of course becomes active only during presence of a receiver switch closure signal. More generally, receiver switch timer 50h periodically issues a second switch closure signal of predetermined duration where the predetermined duration of the switch closure signal to terminal 42c is at least approximately an order of magnitude smaller than the time between the end and the start of the receiver switch closure signal. By activating receiver 42 for an interval greater than twice the duration of one BCS transmission, it is certain that receiver 45 will be receiving power throughout at least one complete BCS transmission regardless of the time at which receiver 45 becomes active. In the embodiment here, each individual BCS is 35 ms. long and identical BCS's are transmitted for 1.1 sec. Activating receiver 45 for 80 ms. during each 1.0 sec. interval assures that receiver 45 receives at least one complete BCS each time switch 22a or 22b is closed. We select 1.0 sec. as the interval between the start of individual receiver switch signal sampling intervals simply because we believe that a human user will accept delays of up to 1.0 sec. in the system's response for starting or stopping the main flame. Whatever the delay time chosen, the interval between the start of sampling intervals should be somewhat shorter than the transmitter 10 interval in which the BCS's are issued, to assure that at least one complete BCS is available while receiver 45 is active. Since transmitter 10 is rarely operated more than a few times a day, battery 12 life should be on the order of several years of normal operation, much as for garage door opener transmitters, whose technology is quite similar to that of transmitter 10.

Microprocessor 50 receives at its input terminal 50b each BCS provided by receiver 45 at terminal 45d and stores it in internal memory locations. By performing appropriate processing steps on these pulse trains, microprocessor 50 interprets operator commands encoded in the RF carrier signal to control the operation of burner 30. FIG. 3 is a more detailed flow chart of the software used by microprocessor 50 in controlling the operation of burner 30.

Each system is shipped or otherwise configured before installation with microprocessor 50 and transmitter 10 storing identical security code values. After receiving a BCS from receiver 45, microprocessor 50 tests the security code field 121 of the BCS to be equal to the prerecorded security code value within microprocessor 50. If the security code from receiver 45 and the prerecorded value in microprocessor 50 are equal, then microprocessor 50 examines the control code. If the control code value specifies the burner 30 ON condition then microprocessor 50 provides a switch closure current signal at output terminal 50e which is applied to a control terminal 75c of valve switch 75. Valve switch 75 closes responsive to the first value of the switch control signal and provides an electrical connection between its power terminals 75b and 75c. If the control code value specifies the burner OFF condition, microprocessor 50 ends the switch closure signal to control terminal 75c. Switch 75 opens and shortly thereafter, valve 62 closes.

It is important that the total current draw of converter 70 from thermopile 43 necessary to operate receiver 45 and microprocessor 50 plus the current required to operate valves 57 and 62 be somewhat less than the minimum rated output current for converter 70 so as to provide a margin of adequate power for proper operation in situations where thermopile 43 output falls below the rated minimum. An important issue is assuring adequate power for microprocessor 50 at all times, given the substantial current draw for valve 62 while opening and the lesser draw after opening. These considerations requires careful power management and conservation. Power management requires duty cycling of receiver 45 and processor 50 and storage of adequate power during periods of minimal power usage so that current is available for operating the electronics and opening main valve 62.

We use a relatively large capacitor 44 connected across thermopile terminals 43a and 43b to improve the power factor of the highly inductive valve 62 operator while valve 62 is opening. While valve 62 opens, there is essentially no current available from thermopile 43 for operating microprocessor 50. Capacitor 47 or other type of energy store is connected across converter output terminals 70b and 70c to provide interim current for microprocessor 50 operation when closure current demands for valve 62 divert current from converter 70.

One set of specifications and preferred values for these components is shown in Table 1.

TABLE 1

| REF. NO. | COMPONENT | DESCRIPTION | APPROX. VALUE |
| --- | --- | --- | --- |
| 43 | Thermopile | Power Output | 80 ma. @ .65 v. |
| 62 | Main valve | Current draw | 50 ma. pull-in, 20 ma. hold |
| 57 | Safety valve | Current draw | 10 ma. hold |
| 74, 75 | Valve switch | "On" resistance | <0.3 Ω |

TABLE 1-continued

| REF. NO. | COMPONENT | DESCRIPTION | APPROX. VALUE |
|---|---|---|---|
| 70 | Converter | Power output | 3 v. @ 1–10 ma. |
| 44 | Capacitor | Value | 6.3 v., 1000 µfd. |
| 47 | Capacitor | Value | 6.3 v., 2000 µfd. |

When valve switch 74 or 75 opens, the magnetic field in the associated valve 57 or 62 solenoid collapses creating the well known reverse inductive voltage surge. This voltage surge can be large enough to cause damage to switches 74 and 75 and to converter 70. It is customary to place protective diodes 77 and 78 across the valve terminals which clamp the reverse voltage to ground. Diodes 77 and 78 may be suitable Schottky diodes with low forward voltage drops which provide ample protection against these inductive voltage surges.

FIG. 3 is a flow chart of software or firmware which microprocessor 50 executes to accomplish the control functions within the power available. This flow chart includes only functions which are specific for operating burner 30 and which we believe may not be familiar to those of skill in the art. Each of the various flow chart elements represents a series of microprocessor instructions whose execution accomplishes the function described within the element's box. There are two types of elements in this flow chart. Action elements such as that shown at 82 specify some data manipulation, in the case of action element 82, acquiring a pulse train from receiver 45. Decision elements such as that shown at 80 may change the sequence of instruction execution based on some condition of data within microprocessor 50. For example, decision element 80 tests the numerical value recorded in a memory location holding a lockout timer value. If this value is not 0, no further execution of instructions represented by the flow chart of FIG. 3 occurs. If it is 0, then instruction execution continues with action element 82 instructions.

Typical microprocessor designs suitable for use as microprocessor 50 have clock-based software interrupts which cause certain instruction series (tasks) to be executed at preselected intervals. Interrupts are also generated when an external data source has data available for use by microprocessor 50. All of these functions are under the control of an executive routine. The executive routine checks a table of times for executing tasks against the current value in an internal real time clock. Each time has associated with it the address of the series of instructions which perform the associated task. When the internal clock time exceeds a time in the table, then the executive routine transfers instruction execution to the address associated with that time. Executing the instructions beginning at that address causes the microprocessor to perform the associated task.

As stated earlier, upon first receiving power, microprocessor 50 executes a bootup routine which initializes certain conditions within itself and controller 40. The one action already stated is that of closing valve switch 74 to provide holding power to valve 57. Other actions which are also performed in the bootup routine are setting to 1 sec. a control signal lockout timer (CSLT) held in a dedicated memory location, and initiating receiver switch 42 cycling as explained in connection with switch 42 above.

After the bootup routine is executed, microprocessor 50 starts an executive routine which comprises a series of instructions for processing and generating interrupts by which various activities are performed at the proper times. Time-based interrupts are managed by the executive routine which maintains a interrupt table in which are stored timers controlling the times at which various activities are performed or may not be performed. A starting address for the operating routine associated with a particular timer is stored in association with that timer. It is not necessary to detail the operation of the executive routine as operation of such software is well know to those skilled in this technology. Microprocessor 50 includes a clock which runs at 1 mhz. and can be used to provide increments automatically at longer desired intervals, and by which interrupt table entries can be incremented and decremented. Among the timers in the interrupt table is an input data timer which periodically causes microprocessor to scan a set of input data request bits. These may be set by external signal sources and which indicate that data is ready to be transmitted to an associated input data port.

At indeterminate times, transmitter 10 radiates an RF signal detected by receiver 45. Receiver 45 provides a decoded 12 byte BCS to microprocessor input terminal 50b. In response, the executive routine transfers instruction execution to the instructions which decision element 80 symbolizes. In one version of microprocessor 50, this interrupt occurs when receiver 45 sets an input data request (IDR) bit in an input register which microprocessor 50 periodically tests. When this bit is sensed as set, the executive routine clears this IDR bit and executes the series of instructions beginning with decision element 80 are executed.

One of the interrupt timers maintained by the executive routine is the control signal lockout timer (CSLT) previously mentioned. During bootup, the CSLT is set to a value representing 1 sec. Say every 10 ms., the executive routine decrements the current value of the CSLT by 10 ms. if the value is not 0. This 1 sec. interval represents the time during which capacitor 47 charges up to a level which allows processor 50 to operate while valve 62 is opening. If the CSLT is not equal to 0, instruction execution returns to the executive routine to await another BCS from transmitter 10. If the CSLT is equal to 0, then the instructions symbolized by action element 82 are executed. These cause the digital values in the BCS from receiver 45 and announced by the IDR bit to be loaded into internal microprocessor 50 storage. The instructions of decision element 83 test the security code portion 120 of the just loaded pulse train to be equal to the preloaded security code value held in microprocessor 50. If the values are unequal, this implies that the RF signal received by receiver 45 was not sent by the transmitter 10 associated with the controller 40 of which microprocessor 50 is a part. In this case, instruction execution returns to the executive routine.

If the security codes are equal, then instruction execution proceeds to the instructions symbolized by action element 84. These instructions reset the CSLT to 1.0 sec. One can see that once the instructions of action element 84 are executed, no other pulse trains can be processed by the instructions symbolized by this flow chart for 1.0 sec.

The instructions of decision element 91 are executed next, and test whether the control code 123 in the pulse train specifies opening valve 62. If true, then instruction execution proceeds to action element 85. The element 85 instructions end the closure signal to receiver switch 42 by clearing the bit dedicated to that purpose. This is necessary to conserve electrical power for microprocessor 50 while valve 62 closes. Next, the instructions symbolized by action element 88 are executed, which starts sends the closure signal to valve switch 75. This is a very critical period from a power management standpoint. During this closure time, which may be as long as 100 ms., no power is available from thermopile 43 because of the high current drain of valve 62 during closure. Capacitor 47 provides interim power during this period for continued operation of microprocessor 50. Since capacitor 47 has limited capacity and since there is no need to operate receiver 45 during valve 75 closure, it is convenient to simply remove power from receiver 45, and this is the rationale for ending the closure signal to receiver switch 42.

After the closure signal to switch 75 has been started, the instructions of action element 98 cause further processing to halt for 100 ms. This can be easily managed by setting a timer value to 100 ms. and using the microprocessor 50 clock to decrement the 100 ms. value to 0. This time allows valve 62 to open completely.

Processing then proceeds to the instructions of action element 101. As mentioned above, each time transmitter 10 becomes active, it issues pulse trains for 1.1 sec. It is thus possible to operate the receiver for as little as 80 ms. per second, and still receive at least one complete 35 ms. pulse train. The instructions symbolized by action element 101 are the software equivalent of timer 50h. The instructions of element 101 cause the closure signal provided on path 50c to switch control terminal 42c to exist for 80 ms. intervals, with 920 ms. intervals with no receiver switch closure signal between these 80 ms. closure signal periods. Thus, the time between the start and the end of the closure signal to switch 42 is approximately an order of magnitude smaller than the time between the end and the start of this closure signal. This mechanism allows capacitor 47 to most quickly reach and sustain its maximum charge, and at the same time provides for detection of a new BCS within 1 sec. of a switch 22a or 22b being closed. The timing can be managed by using the microprocessor clock and a dedicated timer. Typically, the bootup routine will also enable duty cycling of receiver switch 42.

After the instructions for action element 101 have been executed, the instructions for action element 103 are executed. The characteristics of typical electrically operated valves permit the valve to be held open with average current perhaps half that required for opening the valve. It is possible to cycle the valve switch 75 closure signal, with an on time of say 0.5 ms. and an off time of 0.5 ms., and still hold valve 75 in its open position. The instructions of action element 103 enable this cycling by activating a special automatic timer function within microprocessor 50, thereby reducing total current draw by valve 75 while open. In one version of this system, a third adjustable throttling valve controls flow rate of fuel to main burner 54. This throttling valve requires a substantial amount of current, so any means available to conserve current is important. Instruction execution then returns to the executive routine.

Returning to the instructions associated with decision element 91, if the BCS control code field does not specify opening valve 62, then the instructions of decision element 92 are executed. If the control code specifies closing valve 62, then instruction execution proceeds to action element 95. The instructions symbolized by element 95 end the closure signal to valve switch 75. This causes valve 62 to close and the main flame sustained by burner 54 to end. Instruction execution then returns to the executive routine. If the control code does not specify closing valve 62, then other control code commands may be executed, and eventually instruction execution returns to the executive routine.

It is also possible to operate the system at other frequencies of the electromagnetic (EM) spectrum such as in the infrared (IN) range, although the presence of substantial amounts of infrared radiation from the fireplace flame itself makes this perhaps more difficult to achieve. It is also possible for the transmitter unit 10 to communicate to the controller 40 sonically. All of these various types of communication are based on some type of wireless signal. The RF signal technology is preferred at the present time for the simple reasons that first, it is most compatible with the environment in which it operates occurs and secondly, this technology is in wide use in other applications, and thus is very well understood and easily available. Nonetheless, it should be understood that a variety of wireless communication modes fall within the spirit of this invention.

We claim:

1. A controller for a burner unit having a main burner and a standing pilot burner forming a pilot flame and mounted to ignite fuel flowing from the main burner, comprising:

a) an electrical generator receiving energy from the pilot flame for generating from the flame energy a first power voltage across first and second generator power terminals;

b) an electrically operated fuel valve for receiving fuel from a fuel source and for controlling fuel flow to the main burner, said valve having an open state allowing fuel flow from the fuel source to the main burner responsive to presence of valve operating power across first and second valve power terminals of said valve, and closing responsive to absence of the valve operating power at the valve power terminals, said second valve power terminal in electrical connection to the second generator power terminal;

c) a wireless signal receiver receiving at first and second receiver power terminals, operating power from the generator, said receiver for receiving a coded wireless control signal having encoded therein a control code having a preselected value specifying an operating condition for the burner unit, and providing a burner control signal encoding the preselected value of the control code;

d) a logic unit receiving at first and second logic unit power terminals, power from the generator, and receiving the burner control signal, and responsive to the preselected value of the control code encoded in the burner control signal, providing a first switch closure signal; and e) a valve switch having a first valve switch power terminal connected to the first generator power terminal, a valve switch control terminal connected to receive the first switch closure signal, and a second valve switch power terminal connected to the first valve power terminal, wherein presence of the valve switch closure signal at the valve switch control terminal causes the first and second valve switch power terminals to electrically connect, thereby connecting the first generator power terminal to the first valve power terminal, said generator providing at least a portion of the valve operating power when the first and second valve switch terminals are connected.

2. The controller of claim 1, wherein the electrical generator comprises a thermopile mounted to receive heat from the pilot burner, and responsive thereto providing the power voltage to the first and second generator power terminals.

3. The controller of claim 2, further comprising a capacitor connected across the thermopile's first and second power terminals.

4. The controller of claim 2, wherein the valve switch comprises a low voltage drop MOSFET transistor.

5. The controller of claim 2, further comprising a DC to DC converter receiving the first power voltage at first and second converter power terminals and providing a second power voltage across third and fourth converter power terminals of the converter to the first and second logic unit power terminals.

6. The controller of claim 5, further comprising an electrical store connected across the third and fourth converter power terminals.

7. The controller of claim 6, wherein the electrical store comprises a capacitor.

8. The controller of claim 7, wherein the receiver switch comprises a low voltage drop MOSFET transistor.

9. The controller of claim 7, including a receiver switch having a first receiver switch power terminal connected to the third converter power terminal, a second receiver switch power terminal connected to the first receiver power terminal, and a receiver switch control terminal, wherein presence of a receiver switch closure signal at the receiver switch control terminal electrically connects the first and second receiver switch power terminals, thereby connecting the first receiver power terminal to the third converter power terminal.

10. The controller of claim 9, wherein the logic unit comprises a processor including an instruction sequence causing the logic unit to periodically start the receiver switch closure signal and thereafter end the second switch closure signal.

11. The controller of claim 10 for use with a coded wireless control signal having a predetermined duration, and wherein the processor provides a receiver switch closure signal having a duration greater than twice the coded wireless control signal's predetermined duration.

12. The controller of claim 5, including a receiver switch having a first receiver switch power terminal connected to the third converter power terminal, a second receiver switch power terminal connected to the first receiver power terminal, and a receiver switch control terminal, wherein presence of a receiver switch closure signal at the receiver switch control terminal electrically connects the first and second receiver switch power terminals, thereby connecting the first receiver power terminal to the third converter power terminal.

13. The controller of claim 12, wherein the logic unit includes a receiver switch timer periodically starting and then ending the receiver switch closure signal.

14. The controller of claim 13, adapted for use with a transmitter having a predetermined transmission time wherein the receiver switch timer issues receiver switch closure signals at intervals shorter than the predetermined transmission time.

15. The controller of claim 12, wherein the logic unit comprises a processor including an instruction sequence causing the processor to periodically start the receiver switch closure signal and thereafter end the receiver switch closure signal.

16. The controller of claim 15, wherein the processor instruction sequence creates a time between the start and the end of the receiver switch closure signal at least approximately an order of magnitude smaller than the time between the end and the start of the receiver switch closure signal.

17. The controller of claim 1, including a receiver switch having a first receiver switch power terminal connected to the third converter power terminal, a second receiver switch power terminal connected to the first receiver power terminal, and a receiver switch control terminal, wherein presence of a receiver switch closure signal at the receiver switch control terminal electrically connects the first and second receiver switch power terminals, thereby connecting the first receiver power terminal to the third converter power terminal.

18. The controller of claim 17, wherein the logic unit includes a receiver switch timer periodically starting and then ending the receiver switch closure signal.

19. A controller for a burner unit having a main burner and a standing pilot burner forming a pilot flame and mounted to ignite fuel flowing from the main burner, comprising:

a) an electrical power source providing a first power voltage across first and second power source power terminals;

b) an electrically operated fuel valve for receiving fuel from a fuel source and for controlling fuel flow to the main burner, said valve having an open state allowing fuel flow from the fuel source to the main burner responsive to presence of a valve operating power at first and second valve power terminals, and closing responsive to absence of the valve operating power at the valve power terminals, said second valve power terminal in electrical connection to the second power source power terminal;

c) a wireless signal receiver operating responsive to power from the power source applied to first and second receiver power terminals, said second receiver power terminal connected to the second power source power terminal, said receiver while operating, receiving a wireless control signal having encoded therein a control code having a preselected value specifying an operating condition for the burner unit and providing a burner control signal encoding the preselected value of the control code;

d) a logic unit receiving at first and second logic unit power terminals, power from the power source, and receiving the burner control signal, and responsive to a preselected value of the control code, providing a valve switch closure signal;

e) a receiver switch timer periodically issuing a receiver switch closure signal of predetermined duration;

f) a valve switch having a first valve switch power terminal connected to the first power source power terminal, a valve switch control terminal connected to receive the valve switch closure signal, and a second valve switch power terminal connected to the first valve power terminal, wherein presence of the valve switch closure signal at the valve switch's control terminal causes the first and second valve switch power terminals to electrically connect, thereby connecting the first power source power terminal to the first valve power terminal, said power source providing at least a portion of the valve operating power when the valve switch is closed; and g) a receiver switch having a first receiver switch power terminal connected to receive power from the power source, a second receiver switch power terminal connected to the first receiver power terminal, and a receiver switch control terminal receiving the receiver switch closure signal and responsive to which the receiver switch electrically connects the first and second receiver switch power terminals, thereby connecting the receiver to receive power from the power supply while the receiver switch closure signal is present.

20. The controller of claim 19, wherein the logic unit comprises a processor and the timer comprises elements of the processor including a receiver cycling instruction sequence causing the processor to periodically start the receiver switch closure signal and thereafter end the receiver switch closure signal.

21. The controller of claim 19, wherein the predetermined duration of the receiver switch closure signal is at least approximately an order of magnitude smaller than the interval between consecutive starts of the receiver switch closure signal.

22. The controller of claim 19, adapted for use with a transmitter having a predetermined transmission time wherein the receiver switch timer issues receiver switch closure signals at intervals shorter than the predetermined transmission time.

\* \* \* \* \*